United States Patent [19]
Doig et al.

[11] Patent Number: 5,143,610
[45] Date of Patent: Sep. 1, 1992

[54] FILTER ASSEMBLIES

[75] Inventors: Raymond Doig, Greater Manchester; Peter Stessl, Lancashire, both of United Kingdom

[73] Assignee: British Nuclear Fuels PLC, Cheshire, England

[21] Appl. No.: 724,138

[22] Filed: Jul. 1, 1991

[30] Foreign Application Priority Data

Jul. 10, 1990 [GB] United Kingdom ............... 9015136

[51] Int. Cl.⁵ .............................. B01D 29/11
[52] U.S. Cl. .................... 210/232; 210/322; 210/455; 55/492; 55/503
[58] Field of Search ............... 210/232, 322, 239, 340, 210/341, 346, 433.1, 323.2, 448, 335, 455, 339, 461, 434, 463, 497.01, 299, 300, 302; 55/492, 495, 503

[56] References Cited

U.S. PATENT DOCUMENTS

| | | |
|---|---|---|
| 827,389 | 7/1906 | Paul .................................. 210/351 |
| 4,134,836 | 1/1979 | Rowley et al. ..................... 210/232 |
| 4,247,399 | 1/1981 | Pitesky . | |

FOREIGN PATENT DOCUMENTS

| | | |
|---|---|---|
| 2010086 | 2/1970 | France . |
| 462112 | 9/1968 | Sweden . |
| 664235 | 1/1952 | United Kingdom . |
| 802764 | 10/1958 | United Kingdom . |
| 1415281 | 11/1975 | United Kingdom . |
| 1586802 | 3/1981 | United Kingdom . |
| 1595846 | 8/1981 | United Kingdom . |
| 2206294 | 1/1989 | United Kingdom . |

Primary Examiner—Robert A. Dawson
Assistant Examiner—W. L. Millard
Attorney, Agent, or Firm—William R. Hinds

[57] ABSTRACT

A filter module (11) comprises a housing divided internally by a partition (14) into two compartments (15, 16). At least one hollow cylindrical filter element (12) is housed in one of the compartments, the or each filter element fitting about an opening (19) in the partition (14). A filter assembly (10) comprises a plurality of filter modules (11) mounted in a fluid flow line (13) such that incoming fluid enters one of the compartments, flows through the walls of the filter elements and filtered flow emerges from the other compartment.

4 Claims, 2 Drawing Sheets

FILTER ASSEMBLIES

The present invention concerns filter assemblies.

BACKGROUND OF THE INVENTION

In particular the invention is concerned with filter assemblies of simple fabrication which can be included in duct work and the like fluid flow lines and occupy less space than existing filter assemblies.

FEATURES AND ASPECTS OF THE INVENTION

According to one aspect of the present invention, a filter assembly for insertion in a fluid flow line comprises a plurality of intercommunicating filter modules, each module comprising a housing with an internal partition dividing the housing into a first and a second compartment to form a set of first compartments and a set of second compartments on opposite sides of the partitions of the assembled modules, the respective compartments in each of the sets intercommunicating with one another and each set being connectable to the flow line, at least one filter element in one of the compartments of each module and mounted at an opening in the partition whereby flow from the flow line enters the compartments at one side of the partitions, passes through the filter elements and filtered flow exits along the flow line from the compartments at the opposite side of the partitions, the assembly having selectively closable openings in both compartments at each of its ends thus allowing the flow from the flow line to be introduced through the filter in either of opposite directions as selected.

Preferably the filter module housings are substantially identical, and are joined in substantially abutting relationship, each module housing having openings in each end of each of its compartments corresponding to the openings at the ends of the assembly to thus provide the intercommunication of the compartments in each of the sets with one another.

DESCRIPTION OF THE DRAWINGS

The invention will be described further, by way of example, with reference to the accompanying drawings; in which.

DESCRIPTION OF THE PREFERRED EMBODIMENT

Figure 1:
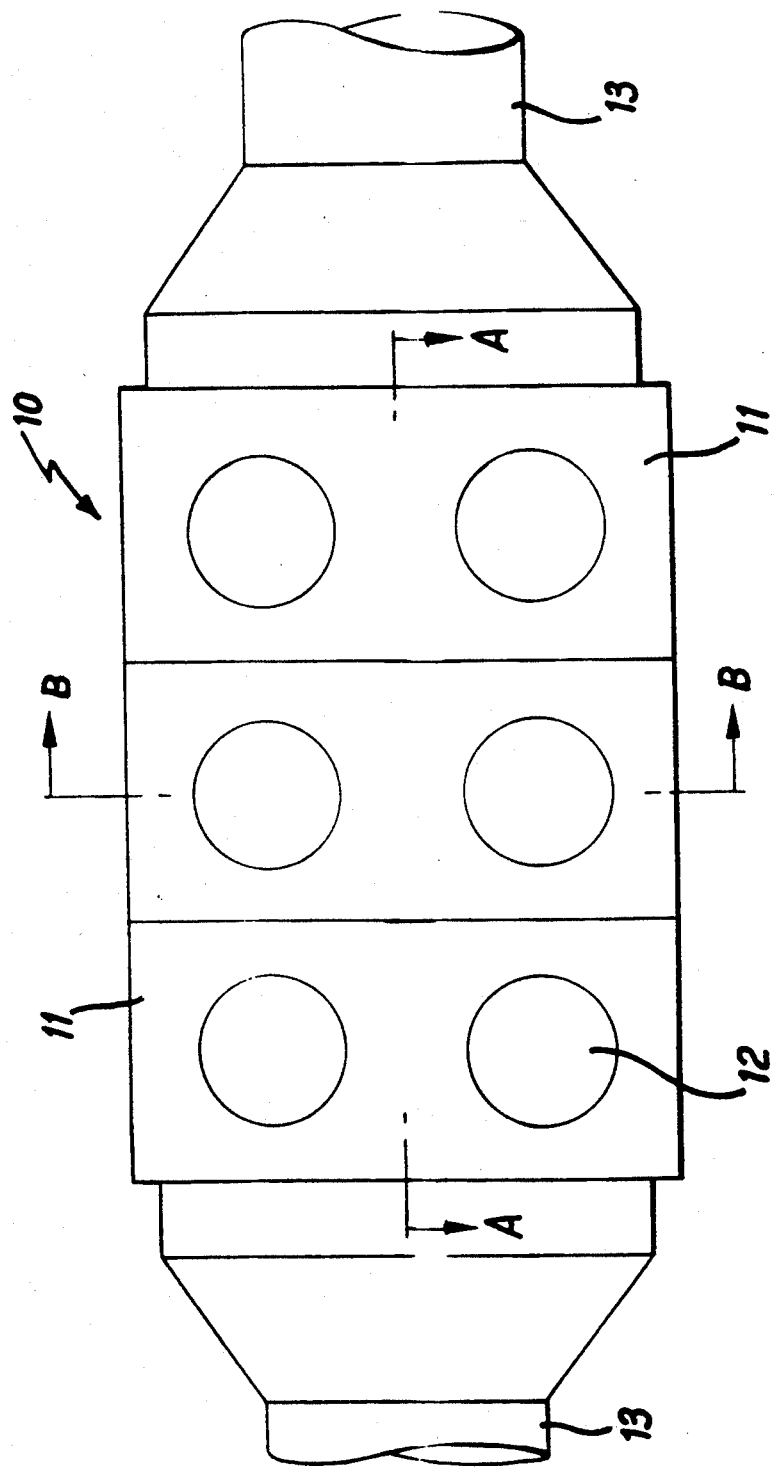
FIG. 1 shows diagrammatically a filter assembly formed from three filter modules and arranged in a gas flow line.

With reference to FIG. 1, a filter assembly 10 is formed from three substantially identical filter modules 11 with each module containing a pair of cartridge type or hollow cylindrical filter elements 12. The assembly is removably located in a fluid flow line 13. The filter modules 11 are joined together to form the assembly 10 such that incoming fluid at one end of the assembly passes through the filters and filtered fluid emerges at the opposite end of the assembly. The assembly 10 can be formed from any desired number of filter modules joined together.

Each filter module 11 comprises a box-shaped housing divided internally by a partition 14 into two compartments 15 and 16. Two hollow cylindrical filters 17 are housed in the compartment 16, each filter fitting on to a flange or lip 18 about an opening 19 in the partition 14. The filters 17 are inserted into and removed from the compartment 16 through removable cover plates 20 in a wall of the housing.

Figure 2:
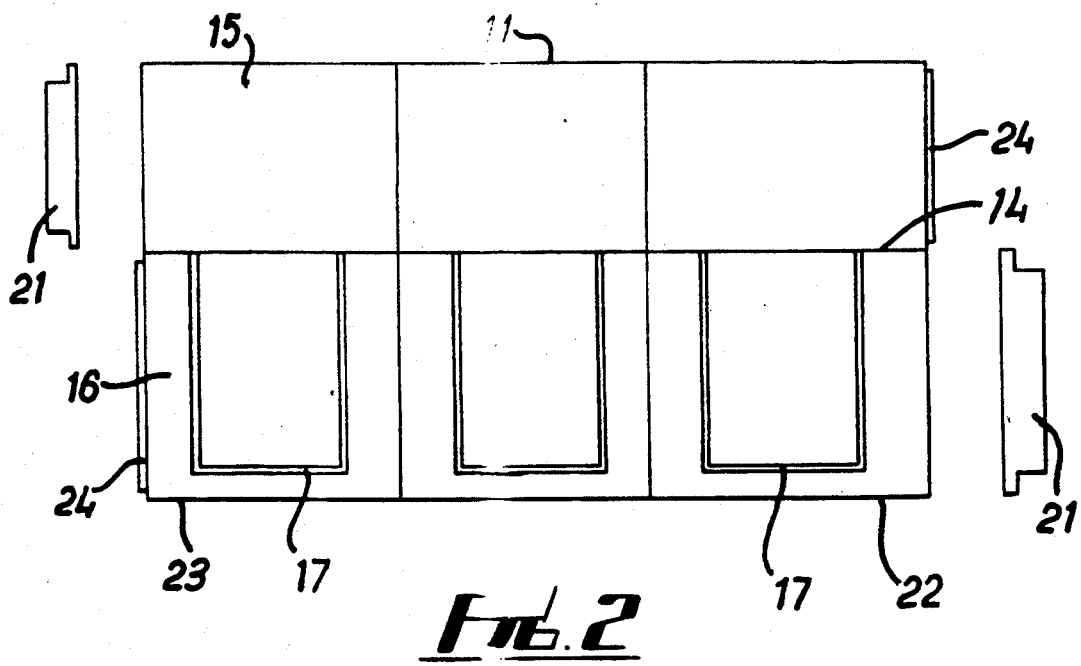
FIG. 2 is a section on A—A in FIG. 1.
Figure 3:
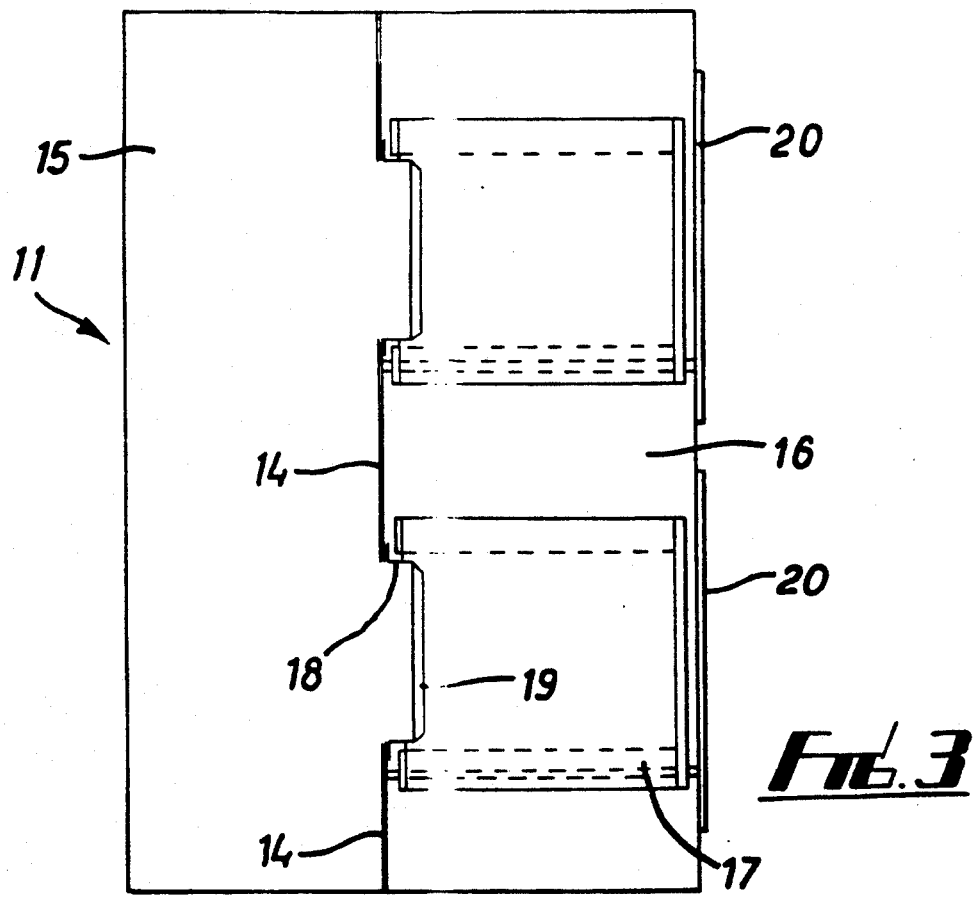
FIG. 3 is a section on B—B in FIG. 1.

The walls of the two compartments 15 and 16 are provided with openings to permit intercommunication between modules of a filter assembly and also to permit communication with the flow line 13. With reference to the assembly of three modules 11 shown in FIG. 2, the compartments 16 of the modules containing the filters 17 communicate with each other through the openings in the walls thereof. A removable connection member 21 is fitted about the opening in the end wall of module 22 in FIG. 2 and the flow line 13 is connected to this connection member 21. At the opposite end of the assembly the opening in the end wall of the module 23 is closed by a removable cover 24. Likewise, the compartments 15 at the opposite side of the partition 14 are in communication with each other. In this case, the opening in the end wall of compartment 15 in module 22 is closed by a removable cover 24 and a connecting member 21 is provided in the end wall of the corresponding compartment 15 in the module 23 for connection to the fluid flow line 13. Thus with the assembly of three modules located in the fluid flow line 13, incoming fluid enters the compartments 16, passes through the walls of the filters 17 and filtered flow emerges through the openings 19 in the partition 14 into the compartments 15. From the compartments 15 the now filtered fluid flow continues along the flow line 13.

Alternatively, the flow direction through the filter assembly can be reversed, that is, incoming fluid enters the compartments 15, passes through the openings 19 and flows radially outwardly through the walls of the filters 17 to emerge into the compartments 16.

In the above arrangements the filter assembly 10 comprises three juxtaposed filter modules 11 with each module containing two filters 17. It will be appreciated that the filter assembly is no confined to this arrangement. The number of modules in the assembly can be one or more and the number of filters in each module can likewise be one or more. However the preferred arrangement is for two filters 17 in each module 11.

We claim:

1. A filter assembly for insertion in a fluid flow line comprising a plurality of intercommunicating filter modules, each module comprising a housing with an internal partition dividing the housing into a first and a second compartment to form a set of first compartments and a set of second compartments on opposite sides of the partitions of the assembled modules, the respective compartments in each of the sets intercommunicating with one another and each set being connectable to the flow line, at least one filter element in one of the compartments of each module and mounted at an opening in the partition whereby flow from the flow line enters the compartments at one side of the partitions, passes through the filter elements and filtered flow exits along the flow line from the compartments at the opposite side of the partitions, the assembly having selectively closable openings in both compartments at each of its ends thus allowing the flow from the flow line to be introduced through the filter in either of opposite directions as selected.

2. A filter assembly as claimed in claim 1 comprising three juxtaposed filter modules with each module containing two filter elements.

3. A filter assembly as claimed in claim 1 wherein the modules are box-shaped and are arranged in a row generally along the axis of the flow line.

4. A filter assembly as claimed in claim 1 wherein said filter module housings are substantially identical, and are joined in substantially abutting relationship, each module housing having openings in each end of each of its compartments corresponding to said openings at the ends of said assembly to thus provide said intercommunication of the compartments in each of said sets with one another.

* * * * *